Aug. 24, 1954  E. W. MERRILL  2,687,445
BATTERY SEPARATOR
Filed April 11, 1950
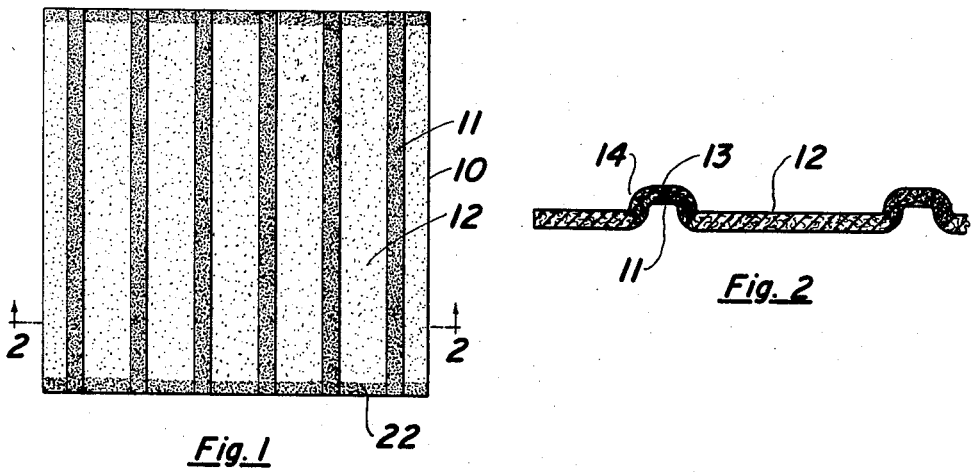
Fig. 1
Fig. 2
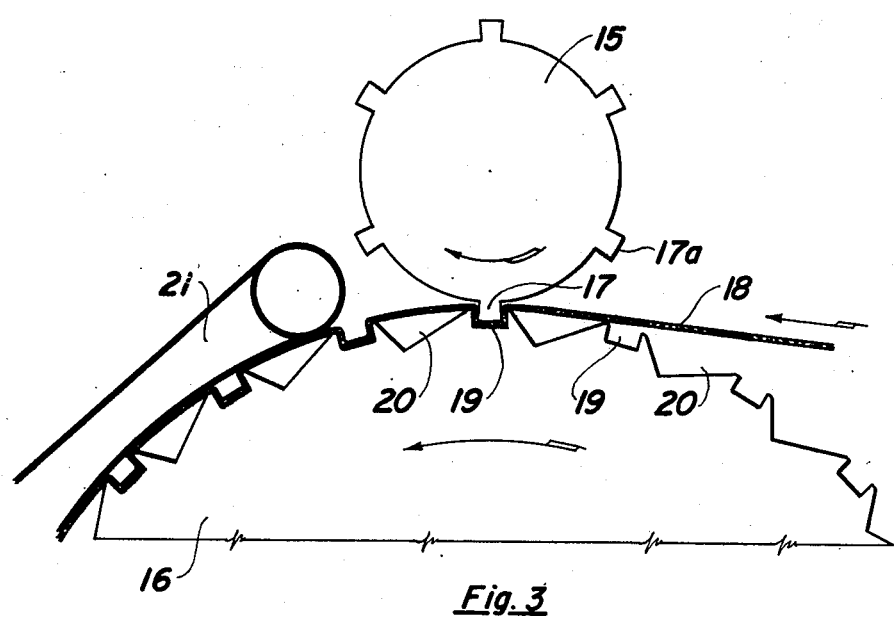
Fig. 3
Inventor
Edward Wilson Merrill
By Theodore C. Browne
Attorney Patented Aug. 24, 1954

2,687,445

UNITED STATES PATENT OFFICE 2,687,445

BATTERY SEPARATOR

Edward Wilson Merrill, Cambridge, Mass., assignor to Dewey and Almy Chemical Company, North Cambridge, Mass., a corporation of Massachusetts Application April 11, 1950, Serial No. 155,294

2 Claims. (Cl. 136—145)

It has been proposed to make battery separators by forming a web of cellulose or other felting fibre, impregnating the web with a solution of an acid-resistant thermosetting resin, rolling ribs into the web after the manner of a corrugating machine, and subsequently curing the resin trapped in the web. Mixtures of fibres have also been proposed such as glass fibre and a felting fibre, usually cellulose. Glass fibre not only produces a web having considerable strength, but its springy nature produces an open, lofty sheet which, even though it is bounded together by cured resin, is nonetheless so porous that it offers but slight resistance to the passage of electrolyte. This fact makes the glass-cellulose fibre web well adapted as a base for separators designed for the very high discharge rates of automotive starting batteries. Where the discharge rate of the battery is low, as in fire signal and communication service, glass is not necessary.

Glass is not a felting fibre. Cellulose is. Cellulose is used in proportions which will make web formation with glass fibres possible. The resin is used to protect the cellulose fibres from being attacked by battery acid, to give sufficient rigidity to the separator to permit its assembly in a battery and to retain its form when it is wet with battery acid.

The rib height of separators produced by this process is not uniform. The separators lack rigidity when they are wet with battery acid and tend to compress. In consequence, they are not suitable for use when rigid plate spacings must be maintained. Another defect of the prior separators was the low proportion of resin which could be carried and still maintain a sufficiently low electrical resistance.

The objects of this invention are to avoid such defects and to produce low resistance, dimensionally stable, chemically resistant separators, to prevent glazing in the electrolyte-permeable areas of the separator and, additionally, to produce such separators in a high yield, continuous manner.

As the specification proceeds, it will become obvious that two forms of conducting the improved process are practicable: one, a continuous process using webs of indefinite length worked upon essentially throughout by rotating machinery, and two, a discontinuous process utilizing webs of finite length in which form is given to the separator by flatbed or platen forming apparatus. Both modes of manufacture are within the scope of my invention. A continuous process, however, nearly always produces a more uniform and a cheaper product. Such is the case here. Accordingly, I set forth a continuous production method of producing improved separators and give an example of glass-cellulose fibre web as the preferred example of my process, although, as explained, glass may not always be necessary.

In the attempt to avoid the serious difficulties encountered in the earlier process, it appeared that the variations in thickness and the change in the dimensions of the sheet were due to the spontaneous flattening and squirming of the formed rib as the sheet dried or was cured. But whenever it was attempted to stabilize the dimensions of the separator or to protect the cellulose fibres in a higher degree from the action of the battery acid by increasing the concentration of resin, there appeared glazed spots of an impermeable skin which sealed off portions of the areas of the separator which were intended to carry the electrical current. Glazing was neither predictable nor uniform, but always occurred in areas which had been subjected to some pressure during the cure of the resin.

The process may be better understood by reference to the drawings in which

Figure 1 is a top view of my improved battery separator,

Figure 2 is a sectional view on the line 2—2 of Figure 1, and

Figure 3 is a diagrammized representation of the rib-forming machine.

In the drawings, the higher concentration of resin in the rib and margin areas is represented by the denser stipple.

Separator 10 illustrated in Figure 1 is adapted for use in a standard automotive type of starting battery. The ribs 11, however, are raised from the sheet areas 12, as is more clearly shown in Figure 2. The top 13, and the wall area 14 of the ribs 11 carry a much higher proportion of resin than that in the sheet areas 12, so high in fact that the rib 11 may be essentially impermeable.

Such separators are made in the following manner. Glass fibres and cellulose pulp, preferably kraft pulp, are placed in a paper beater and, with as light beating in water as possible, are formed into a uniform slurry.

Considerable variation in the length of the glass fibres, their diameter, and the mutual proportions of glass and cellulose fibres is possible, but as an example a slurry formed of 50% glass fibres having dimensions varying between .0004 and .0006 of an inch in diameter and ⅛" to ¼" in length and 50% kraft pulp fibre will felt properly. After the slurry is run out on the wire, drained, calendered, and dried, the felt is slit into widths equal to the vertical height of the separators. The slit roll is then floated across a bath containing a thermosetting resin. Many suitable resins are available. The esesntial characteristics are that the resin shall resist battery acid, coat the fibres well, and re-act to a relatively inert, infusible stage in the presence of heat. Examples are the furfural-aldehyde resins, urea-aldehyde resins and the phenolic group.

Floating the web permits the resin solution to be imbibed from the lower surface. As the solution rises by capillarity through the web, air is expelled through the open upper surface. This procedure insures almost instantaneous saturation. If, on the other hand, the web is led beneath the solution, air is trapped in the interstices of the web and the penetration of the resin is delayed for a very long time. Preferably, the resin is advanced at this time only to a stage at which the resin is soluble in a simple solvent such as water, alcohol, or acetone. For example, if a phenolic resin is used then, depending on the particular resin and depending on the specific web, a water solution may be used for impregnation which may contain from 10 to 35% of resin solids, because again depending on the formulation of the web, from 12½ to 30% of resin solids should be retained in the sheet after the calendering step.

The saturated web is then run through a calender which preferably is adjusted to exert a limited thrust per linear inch. Otherwise, there is danger that the sheet will be broken up in the calendering operation. Suitable pressures for the felt formulae just given may be as high as 75 lbs. per linear inch, or as low as 50 lbs. per linear inch, and such pressures ordinarily temporarily compress the stock approximately five thousandths of an inch. The sheet is then carefully dried. During drying, the sheet recovers about .004 of an inch in thickness.

It is advantageous to dry the web quite slowly in air that is heated to not over 150° F. Rapid drying causes the resin to concentrate adjacent the surface and leave the central portion of the sheet. The surface concentration may leave such a small proportion of resin in the center of the web that later the organic fibres may be attacked by battery acid. After the web is formed, dried, slit, impregnated with resin and again carefully dried, it is run through the rib-forming apparatus diagrammatically indicated in Figure 3. In the continuous process, this consists of a bank of two rolls 15 and 16. The bed roll 16 is of considerable diameter, for the ribs of the separator are cured in the slots cut across its face. A large diameter is necessary to allow the time of contact necessary for cure to take place. The rib-forming roll 15 on the other hand has quite a small diameter. Its maximum size is determined by the spacing of the ribs but if the cutting or pulling apart of the web is to be avoided, it is essential that only one of the transverse ribbing bars 17 which extend across the face of the roll 15 shall touch the web 18 at any one time. The radius of the ribbing roll 15, therefore, must be so small that an adjacent ribbing bar 17a is not tangent to the bed roll at any time that the preceding ribbing bar 17 is engaging the slot 19 cut in the bed roll 16.

Many of the suitable resins are condensation polymers and when they polymerize release water. When such resins are used, it is quite necessary that all web-contacting parts of the rib-forming apparatus be maintained above the boiling point of water and to get a sufficiently rapid cure preferably be heated to a temperature of about 350° F. If the temperature is less than 212° F., the water released in the condensation reaction will condense and form water spots which in turn produce erratic electrical characteristics.

By referring to Figure 3, it will be noticed that there is a wide inclined slot 20 cut in the face of the bed roll 16 between each rib-forming slot 17—17a etc. The floor of the slot 20 lies at an angle of about 15° to the tangent of the bed roll and merges with the normal periphery of the roll just in advance of the succeeding rib-forming slot. Consequently, as the impregnated web material is fed between the rolls, the web is pushed by the ribbing bar 17 into the rib-forming slot 19 of the bed roll; and since the rolls are heated well above the curing temperature of the resin, the resin in the newly formed rib portions immediately begins to cure. The resin is the so-called "current carrying" areas does not cure to any substantial degree, because the inclined slot 20 keeps the web wholly out of contact with a heated surface. To hold the web in the slots for a sufficient time to cure the resin, a series of bars 21 is positioned just beyond the periphery of the bed rcll. Clearance between the bars 21 and the bed roll 16 is only that which will allow the web 18 to fit between them. The deformed portions (ribs) 11 of the web which have been pushed into rib-forming slots of the bed roll consequently stay in position on the bed roll during a major part of its revolution. Thus, the web, despite its inherent springy nature, is held in the rib-forming slots until it reaches the take-off point, not shown, where the web leaves the bed roll. At this time, it will be found that the resin contained in that part of the web which has been distorted to form a rib is completely advanced to the "C" or the infusible stage. As a result, the dimensions which have been imposed on the rib by the rib-forming operation are permanent, and no significant dimensional change takes place in the separators after the rib leaves the bed roll.

Curing the ribbed portions only of the separator has two advantages: (1) Whether the continuous or the discontinuous method of production be used, curing the rib while preventing any curing from occurring in the electrolyte carrying areas of the separator prevents glazing, which has been found to be an important cause of high electrical resistance. (2) In the continuous process where the rib-forming slots are cut on the periphery of the bed roll it permits flattening of the separator after the ribs have been cured. If the entire separator were cured on the roll at this time, it would be cured in a curve corresponding to the periphery of the bed roll. Since cured separators are brittle, the separator could not be flattened without danger of breakage.

After the ribs are cured, the web is run over a resin applicator roll in such a manner that only the tops of the ribs come in contact with the roll. The roll carries a film of highly concentrated resin solution on its surface. The result is that a film of resin solution is deposited only on the tops of the ribs. Sometimes it is advantageous to coat the underside of the rib as well. In such cases the web 18 is run between a pair of light-set rolls having the same contour as the ribbing rolls of Figure 3 except that the slot 20 may be omitted. The transverse bars of the upper roll carry films of resin solution on their upper surfaces which are printed off on the underside of the ribs in the web as the rolls revolve. Capillarity draws some of this solution into and onto the vertical wall of the rib, but care must be taken to prevent either the top or bottom application of resin solution from spreading into the electrolyte permeable areas 12. This can be done by making the concentration of resin in this coating solution about 70 to 75% and then quickly passing the web into a curing oven maintained at about 375° to 395° F. At this temperature, the resin sets up so quickly that migration stops. After about 10 minutes in the oven, all the resin in the separator, both the partially cured resin in the areas 12 and the kiss-coat of resin applied to the rib, is thoroughly cured.

As the web leaves the oven, it is floated over the surface of a ½% to 4% (a 2% solution is preferred) water solution of a sulfonated wetting agent such as Turkey red oil. Floating the web allows it to imbibe the wetting-out solution from its underside while out-gassing itself through the upper surface with the same advantage of great speed and uniformity in imbibition which has been described in connection with the resin impregnation.

This step of wetting-out the web is very desirable in the production of a satisfactory separator. The resins are hydrophobic and, unless the separator is wetted-out, it is permeable to battery acid only after a long time has elapsed.

A peculiar and unexplained effect, however, is the necessity for drying the wetted-out web at a low temperature. Prolonged heating at temperatures higher than 180° F. appears to nullify the wetting power of the sulfonated wetting-agent because of some action which is not yet known. In experiments to explain this phenomenon, the wetted-out web was heated in an oven held at 395° F. The wetting power of Turkey red oil was completely destroyed and the separator was completely hydrophobic. Although the effect is not so violent at lower temperatures, any drying temperature above that of boiling water appears to be highly deleterious.

After the low temperature drying just described, the treated web is cut into appropriate lengths to form battery separators. The troubles caused by glazing are completely eliminated because the web in the area 12 is never in contact with a heated pressure-imparting body while the resin is being cured. There are no forces, consequently, which tend to displace the resin and cause it to concentrate in a continuous film. It cures on the surface of the fibres substantially without flow. As a result, the total area in the electrolyte permeable portions 12 is maintained as a permeable membrane and the electrical characteristics of the separator are very uniform throughout an entire run of material. The extra coating of resin on the ribs may be sufficient to make the rib portion essentially impermeable, but since the rib is in contact with the lead peroxide as well as being exposed to battery acid, this protective and stiffening coat of resin contributes greatly to the life of the battery.

The discontinuous process may be carried out by laying the web on a heated flat plate having rib-forming slots and an inclined intermediate slot similar in contour to the slots of the bed roll which, previously, has been described. Single bars may be pushed into rib-forming slots in sequence, or a ribbing roll may be run along on top of the resin-impregnated and dried web which is laid on the plate. The disadvantages in such a procedure are that the web must be cut into relatively short lengths and more time and labor are consumed than when the process runs continuously.

Particularly in connection with automotive storage batteries where the separator is frequently prodded by hydrometers or jabbed by cell-filling syringes, it is an advantage to reinforce the top and bottom edges of the separators with a marginal band of resin 22, Figure 1. The resin is applied to the edges of the web as a kiss-coat by two horizontal resin applicator wheels, the rims of which are wet with a surface film of resin solution. As the web passes between the revolving wheels, its margins become coated with resin solution. When marginal reinforcement is desired, these margin applicator wheels are conveniently incorporated in the rib-coating machine so that the entire kiss-coat operation on the ribs and along the margins of the web may take place at one station and at the same time.

Separators made by this process produce batteries which match or exceed the operating characteristics of wood separator batteries. Their life is equally as long. The discharge rates of the battery can be equally as high, and the separators may be produced at a cost which is economically competitive with the wood separators which are presently used.

I claim:

1. A plate separator for storage batteries formed of a water-laid felt impregnated with a synthetic acid resistant thermoset resin, said resin bonding the fibers and making the same acid resistant and being distributed throughout the entire felt, said felt having portions upthrust therefrom and forming integral ribs extending across the separator, said ribs having a uniform height and being dimensionally stable under conditions of use, that portion of the felt contained in the integral ribs having a greater compactness than the felt in the remaining, current carrying areas of the separator, the ribbed areas only having been cured under both heat and pressure.

2. The plate separator for storage batteries described in claim 1 in which the felt in the current carrying areas of the separator is free from glazing.

References Cited in the file of this patent

UNITED STATES PATENTS

| Number | Name | Date |
|---|---|---|
| 1,185,058 | Chamberlain | May 30, 1916 |
| 1,206,983 | Bliss | Dec. 5, 1916 |
| 1,357,378 | Boyer | Nov. 2, 1920 |
| 1,432,938 | Wood et al. | Oct. 24, 1922 |
| 1,665,604 | Norris et al. | Apr. 10, 1928 |
| 1,671,335 | Willard | May 29, 1928 |
| 1,846,090 | DeLoye et al. | Feb. 23, 1932 |
| 2,004,304 | Wells | June 11, 1935 |
| 2,016,568 | Zinser | Oct. 8, 1935 |
| 2,077,508 | Bierer | Apr. 20, 1937 |
| 2,120,120 | Wells | June 7, 1938 |
| 2,414,177 | Smith | Jan. 14, 1947 |
| 2,465,493 | Strickhouser et al. | Mar. 29, 1949 |
| 2,504,780 | Young | Apr. 18, 1950 |
| 2,531,504 | Dille et al. | Nov. 28, 1950 |
| 2,591,754 | Wilson et al. | Apr. 8, 1952 |
| 2,591,755 | Wilson et al. | Apr. 8, 1952 |